United States Patent [19]

Kako et al.

[11] 4,131,582

[45] Dec. 26, 1978

[54] METHOD FOR PREPARING STABLE AQUEOUS EMULSION OF PHENOLIC RESIN

[75] Inventors: Yuji Kako, Shizuoka; Toyoji Kiguga; Tetsuo Sanuki, both of Fujieda, all of Japan

[73] Assignee: Sumitomo Durez Company, Ltd., Tokyo, Japan

[21] Appl. No.: 809,949

[22] Filed: Jun. 24, 1977

Related U.S. Application Data

[63] Continuation of Ser. No. 341,625, Mar. 15, 1973.

[30] Foreign Application Priority Data

Mar. 14, 1972 [JP] Japan .................................. 47/25299

[51] Int. Cl.$^2$ .............................................. C08L 61/06
[52] U.S. Cl. ..................................... 260/29.3; 260/844
[58] Field of Search ............................... 260/29.3, 844

[56] References Cited

U.S. PATENT DOCUMENTS

| | | | |
|---|---|---|---|
| 2,984,588 | 5/1961 | Graulich et al. | 260/844 |
| 3,014,886 | 12/1961 | Harding | 260/844 |
| 3,161,547 | 12/1964 | Beaulieu | 260/844 |
| 3,932,333 | 1/1976 | Ingram | 260/29.3 |

*Primary Examiner*—Lorenzo B. Hayes
*Attorney, Agent, or Firm*—Peter F. Casella; James F. Mudd

[57] ABSTRACT

A method is disclosed for preparing a stable aqueous emulsion of a phenolic resin which is characterized by adding polyacrylamides and, if required, further adding dispersing agents to the phenolic resin during or after the completion of a reaction of components which comprise (A) between about five (5) and one hundred (100) parts by weight of one or more phenols, (B) between zero (0) and about ninety-five (95) parts by weight of aldehyde-reactive modifier, and (C) in excess of 0.4 mole of aldehydes based on the total amount of one (1) mole of (A) and (B) described above.

Emulsions obtained by the present invention are useful as binders for inorganic materials and organic materials, as compounding ingredients for latex, as emulsion and water paints and so forth; and, furthermore, there are various uses such as grouting agent, reinforcing agent for synthetic rubber, self-hardening binder for foundry sands, raw material of phenolic resin foam, binder for abrasive cloth and paper, and the like.

6 Claims, No Drawings

METHOD FOR PREPARING STABLE AQUEOUS EMULSION OF PHENOLIC RESIN

This is a continuation, of application Ser. No. 341,625, filed Mar. 15, 1973.

BACKGROUND OF THE INVENTION

The present invention relates to a method for preparing a stable aqueous emulsion of phenolic resin, including modified phenolic resins.

Phenolic resins are today applied to a wide range of uses in various forms such as coatings, binders for inorganic materials, binders for organic materials, compounding ingredients for rubbers, laminates, moldings, castings etc. But, before assuming their final forms, phenolic resins are handled as intermediates.

Types of intemediates known hitherto, comprise the following: an aqueous solution of lower condensate of phenolic resin, an organic solvent solution of medium or higher condensate of phenolic resin, an aqueous solution of phenolic resin containing concentrated caustic alkali, a powdered one-step phenolic resin, a powdered two-step phenolic resin. These intermediate materials generally have various kinds of defects, such as storage stability, discoloration, flammability, workability, emission of noxious substances or cutting costs and so forth. Namely, an aqueous solution of a lower condensate of phenolic resin has a short storage life because it is highly reactive, and it easily releases free phenols and free aldehydes into the air during processing because it is comparatively rich in free phenol and in free aldehyde; therefore, there becoming trouble sources for unhealthy working environment and air pollution.

An organic solution of one-step phenolic resin which consists of comparatively lower molecular weight has also defects of emitting noxious substances, of being flammable, of workability, of pricing and so forth. Or an aqueous solution of phenolic resin containing concentrated caustic alkali tends to degrade the adhered or filler, so the originally excellent properties of phenolic resin do not contribute much to the final product, and moreover the product is much discolored. In the case of powdered phenolic resin, its manufacturing cost becomes higher than other forms of phenolic resin products due not only to an additional pulverizing step added to the process, but also at the same time today, requires a large sum of expenses for improving its working environment from the standpoint of labor safety and health regulations.

Therefore, development of an emulsion type intermediate phenolic resin which is free of defects or problems for manufacturing and application has generally been much desired.

However, it has hitherto generally been recognized that phenolic resins are difficult to emulsify. Namely, for emulsification of phenolic resin, there are methods by adding casein or polyvinyl alcohol individually, or with simultaneous addition of surfactants, by sulfomethylating the resin with a sodium bisulfite, by co-condensation of the resin with urea resin, etc.; but, heretofore it has been difficult to obtain an emulsion by any known method which is good in water miscibility and stable for storage. It is a generally known exception that a phenolic resin prepared by using caustic alkali as a catalyst is comparatively easy to emulsify, but a phenolic resin prepared by using amines or acids as a catalyst is very difficult to emulsify in any case.

As a result of various studies to remove such defects described above concerning intermediate materials of phenolic resin and thereby enabling to expand their uses, the inventors succeeded in preparing an emulsion of phenolic resin which is stable for storage and also of low cost, by adding polyacrylamides to phenolic resin during the course or after the completion of the reaction of phenols with aldehydes, adding urea, melamine, etc. as a modif er if required, and reacted under reflux or at somewhat lower temperature than reflux with acid or alkaline catalyst until the mixture becomes turbid.

The main object of adding polyacrylamides in the present invention is to use them as a dispersing agent for the solid fine particles of phenolic resin, and also promoting remarkably the bonding strength by reacting part of polyacrylamides with phenolic resin at the curing stage, and, at the same time, improving the brittleness of phenolic resin by imparting flexibility.

The other object of adding polyacrylamides is to prevent the darkening of phenolic resin which is one fault of the resin when cured, and very light colored phenolic resins are obtained when using ammonia or amine catalyst.

SUMMARY OF THE INVENTION

In realizing the present invention, it is required to take about five (5) to one hundred (100) parts by weight of one or more phenols, and add between zero (0) and about ninety-five (95) parts by weight of aldehyde-reactive modifiers such as urea, melamine, etc., and more than four-tenths (0.4) mole frequently about one (1) to three (3) moles, of formaldehyde donors, i.e., methylene donor compound, such as formalin, paraformaldehyde, hexamethylenetetramine and so forth are next added based on the total amount of one (1) mole of phenols and modifiers, and finally polyacrylamides are added as a dispersing agent, the quantity being between about five tenths (0.5) and about sixty (60) percent by weight of the final solid content of the emulsion. The quantity of polyacrylamides is varied according to the use and purpose of such final products of phenolic resin aqueous emulsions. The reaction is conducted under reflux or at somewhat lower temperature than reflux until the reaction mixture becomes turbid.

Being excellent dispersers for emulsification, polyacrylamides enhance the phenol-aldehyde reaction very much by emulsifying and therefore are effective in reducing the quantities of free phenols and free aldehydes.

EMBODIMENTS OF THE INVENTION

The process of the invention can be carried out by the following methods:

(1) Phenols, modifiers and aldehydes are reacted as required for a period of time with a catalyst, then polyacrylamides are added and the reaction continued so as to obtain the final aqueous emulsion.

(2) Phenols, modifiers and aldehydes are reacted to the required final stage with a catalyst, and after the reaction polyacrylamides are added and mixed uniformly.

(3) Polyacrylamides are added to the mixture of phenols, modifiers and aldehydes with catalyst from the start, and the reaction carried out.

In the cases of (1) and (2) described above, it is possible to separately react phenols with aldehydes, modifiers with aldehydes and then mix them, or first react phenols with aldehydes and then add modifiers, further adding aldehydes if required and continue reaction, or first reacting modifiers with aldehydes, then adding phenols and continue reaction.

Generally speaking, aqueous emulsions of phenolic resin can be obtained by adding polyacrylamides at any time, viz. the beginning, the middle or the end of a reaction between phenols and aldehydes, but in some circumstances no aqueous emulsion can be obtained. For example, during the reaction of phenols with aldehydes using an acid catalyst, the mixture sometimes happens to gel if polyacrylamides are added before starting the reaction, or during the reaction and further continuing the reaction. On the other hand, a dispersing agent is sometimes added to an aqueous emulsion of phenolic resin prepared normally, for improving its storage stability and water tolerance.

This reaction and emulsification can be carried out with usual reaction kettles. Therefore, this invention for preparing aqueous emulsions of phenolic resin does not need an emulsifier such as a "homogenizer" or a "wet grinder" and also obviates the use of mechanical vibration or ultrasonic vibration, so it is extremely efficient and inexpensive.

Phenols which are suitable for the present invention include phenol, ortho-cresol, meta-cresol, para-cresol, xylenol, resorcinol, para-tertiarybutylphenol, para-octylphenol, para-cumylphenol, para-phenylphenol, nonylphenol, bisphenol, naphthols, hydroquinone, pyrogallol, chlorophenol, and the like.

Reactive modifiers which can be used in the present invention include urea, thiourea, ethyleneurea, melamine, dicyandiamide, guanidine, benzoguanamine, acetoguanamine, benzenesulfonamide, aniline, polyamide, alkylbenzene-formaldehyde resin, xylene-resin, and the like.

Aldehydes which are suitable in the present invention are formaldehyde, paraformaldehyde, polyoxymethylene, glyoxal, hexamethylenetetramine, acetaldehyde, propionaldehyde, acrolein, butylaldehyde, and the like.

Catalysts which are used for preparing the basic phenolic resin of the present invention are the same as those used in preparing ordinary phenolic resins: alkali metal and alkaline earth metal hydroxides represented by potassium hydroxide, sodium hydroxide, lithium hydroxide, calcium hydroxide, barium hydroxide, and the like; various kinds of amines such as ammonia, triethylamine, triethanolamine, aniline, and the like; inorganic acids such as hydrochloric acid, sulfuric acid, phosphoric acid, and the like; and organic acids such as formic acid, acetic acid, oxalic acid, sulfamic acid, para-toluenesulfonic acid, and the like.

Polyacrylamides which are used in the present invention include such compounds containing acid amide groups represented by polyacrylamide, polymethacrylamide, partially hydrolyzed products of polyacrylamide and polymethacrylamide, copolymers of acrylamide and acrylic acid and/or methacrylic acid, copolymers of vinyl and acrylamide, copolymers of vinyl and methacrylamide, cationic polyacrylamide, sulfomethylated polyacrylamide, urethane of polyvinylalcohol, and the like; and further, methylol compounds of acid amides described before such as mothylol compound of polyacrylamides.

Dispersing agents which are used as additives in the present invention are such chemicals which are generally called surface active agents or protective colloids; for example, anionic-, non-ionic-, cationic-, and amphoteric-surface active agents, protective colloids such as methylcellulose, carboxymethylcellulose, hydroxymethylcellulose, sodium alginate, polyvinylalcohol, partially hydrolyzed products of polyvinyl acetate, starches, tragacanth gum, casein, gelatine, gluten, polyvinyl methyl ether, polyvinylpyrrolidone, copolymer of styrenemaleic anhydride, polyacrylic acid, polyethylene glycol, and the like. These substances are selected according to the catalyst used or according to the use or purpose of application of the emulsion products. There are instances which do not require such additives, and even when such addition is required, the amount is very small.

Aqueous emulsions of phenolic resin obtained by the present invention are very stable during long term storage and have good water tolerance. And it is also possible to blend various kinds of latex or aqueous resin solutions, and those mixtures can be cured by heating or by adding acidic curing agents such as para-toluene sulfonic acid, hydro-chloric acid, and the like.

Emulsions obtained by the present invention are useful as binders for inorganic materials and organic materials, as compounding ingredients for latex, as emulsion and water paints and so forth; and, furthermore, there are various uses such as grouting agent, reinforcing agent for synthetic rubber, self-hardening binder for foundry sands, raw material of phenolic resin foam, binder for abrasive cloth and paper, and the like.

The aqueous emulsion of phenolic resin obtained by the present invention generally shows characteristics of resins remarkably advanced in degree of reaction, having a short curing time, and show marked improvement in workability. And, when applied as a binder for manufacturing paper, asbestos boards, insulation boards, etc., by the paper making process, the emulsion requires less catalyst such as caustic soda, contains far less free phenol and free aldehyde, so it requires less amount of precipitant; accordingly, less salt in white water, and less dissolved free phenol and free aldehyde; therefore, the fixing rate of precipitant becomes high.

Following examples are shown in order to explain in detail the method of the present invention, but the present invention is not necessarily restricted by them. Unless indicated otherwise, parts are expressed by weight and temperatures are given in degrees Centigrade.

EXAMPLE 1

400 Grams (4.25 moles) of phenol, 100 grams (0.94 mole) of meta-cresol, 800 grams (9.87 moles) of 37% formalin were charged into a reaction kettle provided with agitator, reflux condenser and thermometer, and mixed uniformly, and adding 10 grams of 50% aqueous caustic soda solution, while keeping its temperature at lower than 30° C., next heating it at 70° C. until the reacting liquid becomes turbid, then 300 grams of polyacrylamide (30% aqueous solution manufactured by Sumitomo Chemical Company, Ltd., "Sumirez" A-230) was added immediately and the liquid was emulsified by stirring.

The emulsion was stable and had a good water tolerance after two months storage at room temperature.

EXAMPLE 2

500 Grams (5.32 moles) of phenol and 900 grams (11.1 moles) of 37% formalin were charged into the same kind of equipment described in Example 1, after mixing the content uniformly, 5 grams of triethanolamine and 7 grams of 27% aqueous ammonia was added, then heated and reacted under reflux until the reacting liquid became turbid. 3 grams of carboxymethylcellulose was added immediately to the liquid after it became turbid, then it was cooled down to 80° C. by stirring. Next, 800 grams of polyacrylamide (15% aqueous solution manufactured by Arakawa Rinsan Company, Ltd., "Polystrone" 117) was added to the content, and further stirred and emulsified for 30 minutes at 80° C.

This emulsion had a viscosity of 50 poises at 25° C., and was stable after two months storage at room temperature and it also had a good water tolerance. Products made by the sheet making process using the emulsion as a binder for inorganic material or as a paper treating agent were light colored, and moreover, free phenol and free formaldehyde in the white water were very low, and the fixing rate of alum was good. And in both cases of using the emulsion alone or together with starches, improvement in normal and wet strength of the products were notable.

On the other hand, the storage stability of a mixture with latex such as polyvinyl acetate emulsion was also good, and the color of its dried film was very light.

EXAMPLE 3

600 Grams (6.38 moles) of phenol and 750 grams (9.25 moles) of 37% formalin were charged into the same kind of equipment described in Example 1, and stirring the content uniformly, 6 grams of oxalic acid dissolved in 12 grams of water was added.

The content was heated and reacted under reflux when it became turbid after 40 minutes, whereby the reaction was continued 50 minutes more under reflux. Then, the content was cooled down by adding 600 grams of water and left to settle at 60° C., and the water layer removed. Next, 3 grams of hydroxyethylcellulose (ethylene oxide mole number was 2.0, made by Fuji Chemical Company, Ltd.) was added to it and the mixture was stirred and mixed 20 minutes, then 300 grams of polyacrylamide (15% aqueous solution manufactured by Arakawa Rinsan Company, Ltd., "Polystrone" 117) was added and the temperature of the content was raised to 70° C., then stirred 30 minutes and emulsified. The emulsion did not cure by 10 minutes' heating at 150° C., but cured by adding hexamethylenetetramine or the aqueous resol emulsion described in Example 2, and formed a film having excellent elasticity.

EXAMPLE 4

250 Grams (1.67 moles) of para-tert-butyl-phenol, 250 grams (2.66 moles) of phenol and 680 grams (8.39 moles) of 37% formalin were charged into the same kind of equipment described in Example 1, the content was agitated uniformly, adding 30 grams of 27% aqueous ammonia, then reacted under reflux until it became turbid, and immediately after start of turbidity, 4 grams of hydroxyethylcellulose (ethylene oxide mole number was 1.5, made by Fuji Chemical Company, Ltd.) was added, and cooled to 80° C. Next, 800 grams of polyacrylamide (15% aqueous solution manufactured by Arakawa Rinsan Company, Ltd., "Polystrone" 117) was added and was stirred more 30 minutes at 80° C. and was emulsified.

The cured film had excellent water repellency, pliability and very light in color.

EXAMPLE 5

900 Grams (9.57 moles) of phenol and 1790 grams (22.08 moles) of 37% formalin were charged into the same kind of equipment described in Example 1, mixed uniformly with agitation, 28 grams of 50% aqueous caustic soda solution was added, and reacted one hour and 30 minutes at 80° C.; next, 250 grams of urea was added, and the reaction was continued at 80° C. until the content became turbid. At the turbidity point, 300 grams of polyacrylamide (30% aqueous solution, manufactured by Sumitomo Chemical Company, Ltd., "Sumirez" A-230) was added, and the reaction was continued 10 minutes further at 80° C. The emulsion obtained hereupon was stable for storage and contained very little free phenol and free formaldehyde.

EXAMPLE 6

500 Grams (5.32 moles) of phenol, 50 grams (0.47 mole) of ortho-cresol and 900 grams (8.37 moles) of 37% formalin were charged into the same kind of equipment described in Example 1, and the content stirred uniformly and 8 grams of triethylamine was added. Next, the content was heated under reflux until it became turbid, and immediately after reaching turbidity, 15 grams of styrenemaleic anhydride copolymer (30% aqueous solution, manufactured by Arakawa Rinsan Company, Ltd., "Vinymer" 25) was added and the mixture was cooled, and 900 grams of methyl compound of polyacrylamide (15% aqueous solution) was added and the mixture was stirred and emulsified.

This emulsion was stable for long term storage at room temperature and had a good water tolerance.

EXAMPLE 7

500 Grams (2.43 moles) of para-octyl-phenol, 30 grams (0.32 mole) of phenol and 190 grams (5.07 moles) of 80% para-formaldehyde were charged into the same kind of equipment described in Example 1, the content was heated with stirring, and was uniformly dispersed and mxing for one hour at 100° C., then was cooled to 80° C.

Next, 20 grams of 27% aqueous ammonia was added slowly, and the reaction was continued by heating the admixture for two (2) hours at 100° C., then it was cooled to 80° C., and 5 grams of hydroxyethylcellulose (ethylene oxide mole number was 2.0, manufactured by Fuji Chemical Company, Ltd.) was added, and successively, 700 grams of polyacrylamide (15% aqueous solution manufactured by Arakawa Rinsan Company, Ltd., "Polystrone" 117) was added gradually, and the whole mixture was stirred and emulsified for 10 minutes at 80° C. Finally, 1,200 grams of hot water (70° C.) was added, then an emulsion was obtained.

This emulsion had a good miscibility with latexes.

EXAMPLE 8 400 Grams (3.70 moles) of meta-cresol and 450 grams (5.55 moles) of 37% formalin were charged into the same kind of equipment described in Example 1, agitated uniformly, and 10 grams of 27% aqueous ammonia was added. Then the admixture was reacted by heating under reflux until it became turbid, and immediately after start of turbidity, 2 grams of sodium alginate was added and the mixture was cooled, 800 grams of polyacrylamide (30% aqueous solution manufactured by Sumitomo Chemical Company, Ltd., "Sumirez" A-230) was then added, stirred and emulsified.

This emulsion was stable in long term storage at room temperature, and had a good water tolerance.

We claim:

1. A process for producing an aqueous emulsion which remains stable at room temperature during long term storage consists essentially of the steps of preparing a phenolic resin by commencing the reaction by heating (1) about 5 to about 100 parts by weight of an phenol and 0 to about 95 parts by weight of a modifier reactive with an aldehyde, and (2) a methylene donor compound in a proportion of more than 0.4 mole per mole of the total amount of said phenol and said modifier, in the presence of a catalyst; introducing a polyacrylamide into the reaction mixture, and then continuing the reaction under the same conditions to produce the stable aqueous emulsion, wherein said polyacrylamide is present in a proportion of about 0.5 to about 60 weight percent of polyacrylamide based on the weight of solids present in the stable emulsion.

2. The process of claim 1 wherein said phenolic resin is the reaction product of phenol and formaldehyde.

3. A process for producing an aqueous emulsion which remains stable at room temperature during long term storage consists essentially of the steps of preparing a phenolic resin by reacting (1) about 5 to 100 parts by weight of a phenol and 0 to about 95 parts by weight of a modifier reactive with an aldehyde, and (2) a methylene donor compound in a proportion of more than 0.4 mole per mole of the total amount of said phenol and said modifier, in the presence of an acid catalyst; and after completing the reaction, but during the process of preparing the emulsion, introducing a polyacrylamide into the reaction mixture and mixing uniformly to provide the stable aqueous emulsion, wherein said polyacrylamide is present in the proportion of about 0.5 to about 60 weight percent of polyacrylamide based on the weight of solids present in the emulsion.

4. The process of claim 3 wherein said phenolic resin comprises the reaction product of phenol and formaldehyde.

5. A process for producing an aqueous emulsion which remains stable at room temperature during long term storage consists essentially of mixing a polyacrylamide with (1) about 5 to about 100 parts by weight of a phenol and 0 to about 95 parts by weight of a modifier reactive with an aldehyde and (2) a methylene donor compound in a proportion of more than about 0.4 mole per mole of the total amount of said phenol and said modifier, and reacting the components in the presence of a catalyst to produce the stable emulsion, wherein said polyacrylamide is present in a proportion of about 0.5 to about 60 weight percent polyacrylamide based on the weight of solids present in the emulsion.

6. A process of claim 5 wherei said phenolic resin comprises the reaction product of phenol and formaldehyde.

* * * * *